(12) United States Patent
Nomura (10) Patent No.: US 7,643,722 B2
(45) Date of Patent: Jan. 5, 2010

(54) VIDEO STORAGE SYSTEM

(75) Inventor: Ken Nomura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1044 days.

(21) Appl. No.: 11/002,697

(22) Filed: Dec. 1, 2004

(65) Prior Publication Data

US 2006/0089980 A1 Apr. 27, 2006

(30) Foreign Application Priority Data

Oct. 22, 2004 (JP) ............................. 2004-307584

(51) Int. Cl.
- H04N 5/91 (2006.01)
- H04N 7/00 (2006.01)
- H04N 7/26 (2006.01)
- G06F 15/16 (2006.01)
- G06F 15/173 (2006.01)
- G06F 9/00 (2006.01)
- G06F 17/00 (2006.01)

(52) U.S. Cl. .................. 386/46; 386/124; 709/203; 709/239; 726/11

(58) Field of Classification Search ............ 386/46, 386/107, 83, 124; 709/203, 231, 239; 726/11
See application file for complete search history.

(56) References Cited

U.S. PATENT DOCUMENTS

| | | | | |
|---|---|---|---|---|
| 5,812,733 A | * | 9/1998 | Eto ............................. | 386/68 |
| 6,014,695 A | * | 1/2000 | Yamashita et al. .......... | 709/219 |
| 6,259,705 B1 | * | 7/2001 | Takahashi et al. ........... | 370/465 |
| 6,880,089 B1 | * | 4/2005 | Bommareddy et al. ........ | 726/11 |
| 6,941,374 B1 | * | 9/2005 | Kronz ........................ | 709/229 |
| 7,007,299 B2 | * | 2/2006 | Ioele et al. .................... | 726/14 |
| 7,055,173 B1 | * | 5/2006 | Chaganty et al. ............. | 726/11 |
| 7,093,288 B1 | * | 8/2006 | Hydrie et al. ................ | 726/13 |
| 7,360,244 B2 | * | 4/2008 | Coley et al. .................. | 726/11 |
| 7,409,714 B2 | * | 8/2008 | Gupta et al. ................. | 726/23 |
| 2003/0055516 A1 | * | 3/2003 | Gang et al. .................. | 700/94 |
| 2005/0182843 A1 | * | 8/2005 | Reistad et al. .............. | 709/230 |
| 2005/0257256 A1 | * | 11/2005 | Supnik et al. ................ | 726/11 |
| 2006/0130133 A1 | * | 6/2006 | Andreev et al. .............. | 726/11 |

FOREIGN PATENT DOCUMENTS

JP 09-009195 * 1/1997

OTHER PUBLICATIONS

James F. Kurose & Keith Ross, "Computer Networking, A Top-Down Approach Featuring the Internet", 1956, Chapter 2, Application Layer, pp. 124-127, USA.

* cited by examiner

Primary Examiner—Thai Tran
Assistant Examiner—Hung Q Dang
(74) Attorney, Agent, or Firm—Townsend and Townsend and Crew LLP (57) ABSTRACT

Control data, such as a store-request, and video data are sent via different paths to video storage. More specifically, a load balancer sends the control data from a camera to the storage device, and the camera sends the video data to video storage. By separating the transmission paths of the control data and the video data, it is possible to vary the method for protecting the video storage, depending on the type of data, and to intensively check the control data which are smaller in data quantity, thereby realizing both a high security level and a cost reduction for protecting video storage.

6 Claims, 8 Drawing Sheets

| CAMERA NAME | VIDEO STORAGE ADDRESS | BIT-RATE | FORMAT | STORE TIME | FILENAME |
|---|---|---|---|---|---|
| CAMERA 1 | 192.168.1.1 | 1.4Mbps | mpeg2 | 2001/10/1:14:32 ~ STORING | CAMERA 1-0.01.mpg |
| CAMERA 2 | 192.168.1.2 | 1.4Mbps | mpeg4 | 2001/10/1:12:11 ~ STORING | CAMERA 2-0.01.mpg |
| CAMERA 3 | 192.168.1.3 | 1.4Mbps | mpeg2 | 2001/10/1:01:03 ~ 2002/11/1:10:01 | CAMERA 3-0.01.mpg |
| CAMERA 3 | 192.168.1.4 | 1.4Mbps | mpeg2 | 2001/11/1:10:02 ~ STORING | CAMERA 3-0.02.mpg |

FIG. 12

VIDEO STORAGE SYSTEM

CROSS-REFERENCE TO RELATED APPLICATION

This application relates to and claims priority from Japanese Patent Application No. 2004-307584, filed on Oct. 22, 2004, the entire disclosure of which is incorporated herein by reference.

BACKGROUND OF THE INVENTION

1. Field of the Invention

The present invention relates to a technology for storing videos.

2. Description of Related Art

Recently, a format for storing video content, such as security camera footage and live video, has changed to a digital format which does not have the image degradation of an analog format. With the shift to digital format, there is increased interest in technology for storing video in a system connected to a network. Requirements and needs for video storage technology vary form small-scale video storage technology for room monitoring and the like, to large-scale video storage technology for wide area monitoring, such monitoring a city, or monitoring river traffic A video storage method which receives and stores video data sent from multiple cameras (e.g., security cameras) is known. In conventional technology each of the cameras sends a store-request, i.e., control data, to the video storage unit and sends video data in response to a reply from video storage. Because the quantity of video simultaneously stored in video storage is limited, however, depending in video storage performance, a load balancer (load distribution device) which distributes video data to a number of video storage units is used to handle an increased number of cameras.

In general, the load balancer and the video storage are installed in a monitoring center or the like, and the cameras are distributed widely over the whole monitoring area. Since it is necessary to protect the video storage in a monitoring system designed for crime prevention, a protection device called a firewall is also used. Installing a firewall device in the monitoring center protects the load balancer and video storage from unauthorized access aimed at obstructing monitoring. In the conventional load balancing technology using a Domain Name System (DNS) round-robin function, a plurality of unique IP addresses corresponding to a domain name are registered at a DNS server, and every time a query for an IP address is made to the DNS server one of the IP addresses is sent in response to the query. Thus, the accesses made to one domain are distributed to different destinations. More specifically, the DNS server functions as the load balancer, and the IP addresses provided by the DNS server are the addresses of the allocated video storage units. Moreover, a method of selecting a video storage more sophisticated than the DNS round robin design uses information such as an available memory is known.

The firewall is conventional protection technology, i.e. a device protecting a network from unauthorized access from external networks. The various modes of protection use range from the basic process of permitting accesses from the protected network to be protected outside the network and prohibiting outside access to the protected network, to the complicated process of encrypting a packet and investigating the header content. Since a large quantity of data is sent and received for storing video, a high throughput is required of the firewall. Therefore, the complicated security mode requires a high-speed processor, increasing the cost of the firewall.

The PULL access mode is a method for constructing a firewall with high security and high throughput at a low cost. The PULL access mode, blocks external access to everything inside the, and external data are obtained as a reply to an access from inside the firewall to an outside IP address using a known protocol such as HTTP. The PULL access mode is a generally known method of delineating the firewall.

To send external data directly through the firewall, the PUSH access mode is used. To realize the PUSH access mode, a hole for is needed to pass only specific PUSH accesses through the firewall. To prevent the hole from being a security hazard, countermeasures such as timed opening of the hole, usually in combination with an authentication function are required. That is, the PUSH access mode results in increased cost due to the security maintenance compared to using the PULL access mode only.

SUMMARY OF THE INVENTION

In the conventional technologies described above, the camera eventually sends the store-request to the video storage system, and a video is sent to video storage using the store-request path. Therefore, it is usually not possible to use the PULL mode, which enables the protection of video storage at a low cost, and the cost for protecting video storage is comparably high. Further, with an increase in the scale of the system, the number of video storage modules and the number of protection devices provided in the respective video storage modules are increased resulting in increased installation cost.

To solve the above problems, control data such as the store-request and the video data are sent the video storage using different paths. More specifically, the control data sent from the camera are sent to video storage via a load balancer, and the video data are sent from the camera directly to video storage.

In one embodiment, a system according to this invention includes a first device to which data is input, a second device for selecting a storage destination of data, and a third device for storing the data. The first device includes a first processing unit and a first memory which stores a first program for sending control data to the second device and sending data to the third device. The second device includes a second processing unit and a second memory which stores a second program for sending the control data to the third device depending on signals from the first device. The third device includes a third processing unit, a third memory, and a storage wherein the third memory stores a third program for storing the data received from the first device in the storage depending upon the control data received from the second device.

BRIEF DESCRIPTION OF THE DRAWINGS

FIG. 3 shows a procedure for changing video storage in the case of an obstacle or the like;

DETAILED DESCRIPTION OF THE PREFERRED EMBODIMENTS

First Embodiment

Figure 1:
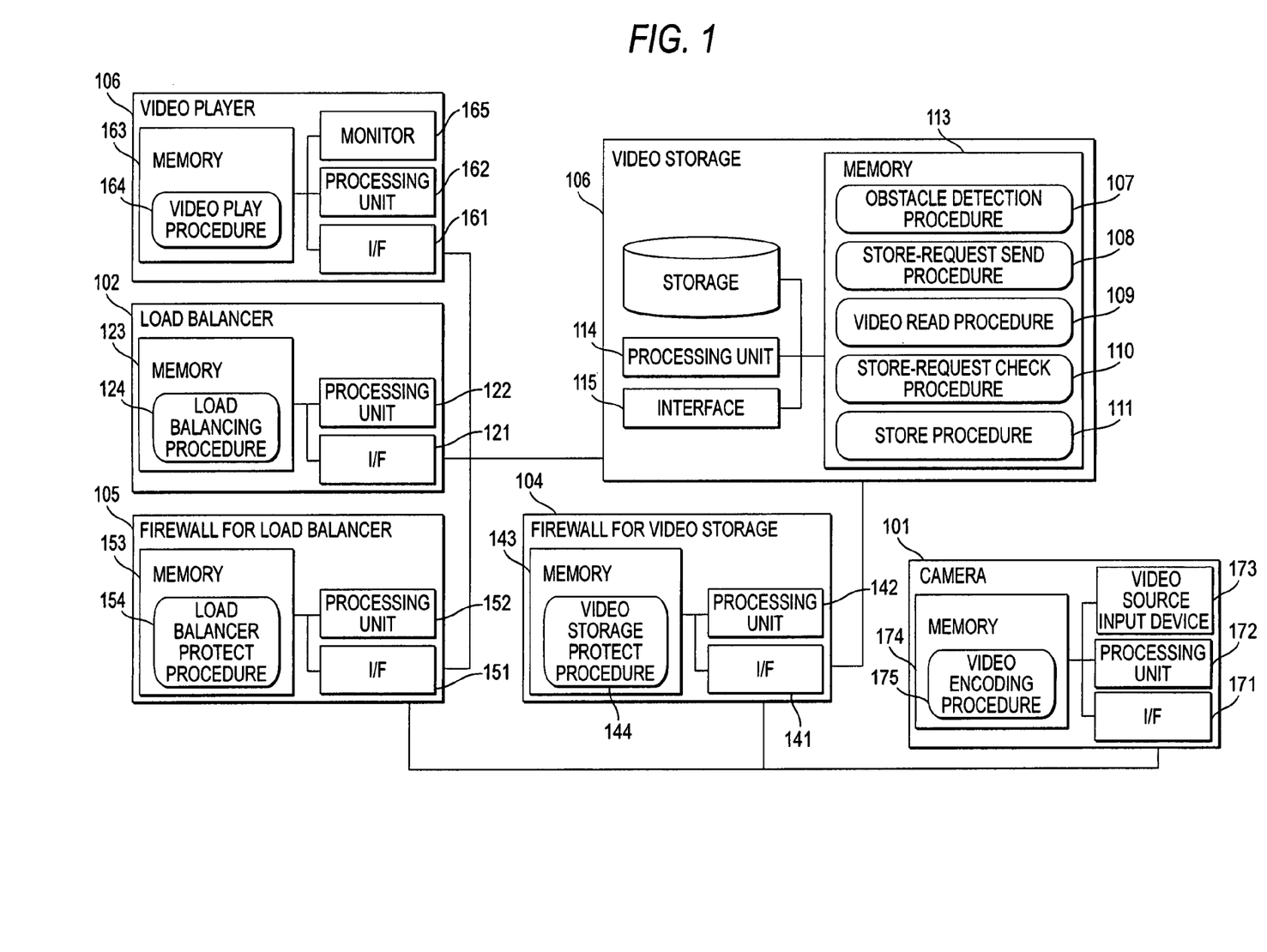
FIG. 1 is a diagram of the configuration of a first embodiment.

FIG. 1 illustrates a system configuration of the first embodiment. The system includes multiple cameras 101, a load balancer 102, a video storage module 103, a video player 106, a firewall 104 for video storage 103, and a firewall 105 for load balancer 102. Video player 106 is a terminal device having a monitor for displaying video. In one implementation, in a building monitoring system, the load balancer 102, video storage 103, video player 106, and firewalls 104 and 105 are installed in a monitoring room, while cameras 101 are installed in the respective floors of the building to be monitored.

Each of the cameras 101 includes an interface 171, a processing unit 172, a video source input device 173, and a memory 174. Memory 174 stores a video encoding procedure program 175. Within camera 101, processing unit 172 packetizes video received from video source input device 173 by executing a video encoding procedure program 175 to send packets to a network via interface 171.

Load balancer 102 includes an interface 121, a processing unit 122, and a memory 123. Memory 123 stores a load balancing procedure program 124. Processing unit 122 receives a store-request sent from camera 101 via interface 121 and selects a video storage to transfer the store-request to the selected video storage module.

Video storage 103 includes a storage element 112, a memory 113, a processing unit 114, and an interface 115. Memory 113 stores an obstacle detection procedure program 107, a store-request send procedure program 108, a video read procedure program 109, a store-request check procedure program 110, and a store procedure program 111. Processing unit 114 executes store-request check procedure program 110 to check whether or not a store-request received via interface 115 is acceptable, and executes store procedure program 111 to store video data in storage 112. Likewise, processing unit 114 executes obstacle detection procedure program 107 to detect an obstacle in storage element 112 and executes store-request send procedure program 108 to send a substitute store-request to another video storage module via interface 115. In addition, processing unit 114 executes video read procedure program 109 to send the video stored in storage element 112 to video player 106.

The firewall for video storage 104 includes an interface 141, a processing unit 142, and a memory 143. Memory 143 stores a video storage protect procedure program 144. Processing unit 142 executes video storage protect procedure program 144 to check a packet received via interface 141. Because processing unit 142 handles a large quantity of video, a high throughput is desirable. By completely prohibiting access from the cameras, it is possible to minimize the processing required for video storage protection.

The firewall for load balancer 105 includes an interface 151, a processing unit 152, and a memory 153. Memory 153 stores a load balancer protect procedure program 154. Processing unit 152 executes load balancer protect procedure program 154 to check a packet received via interface 151. Since processing unit 152 relays a small quantity of control data, it can execute various complicated protection processing. For example, processing unit 152 performs packet encryption such as SSL, TLS, and IPsec. Since it is possible to use a small number of servers for intensively performing authentication processing, a reduction in cost of management, such as password management can be achieved. Video player 106 includes an interface 161, a processing unit 162, a monitor 165, and a memory 163. Memory 163 stores a video play procedure program 164. Processing unit 162 executes video play procedure program 164 to display video data received via interface 161 on monitor 165.

Figure 2:
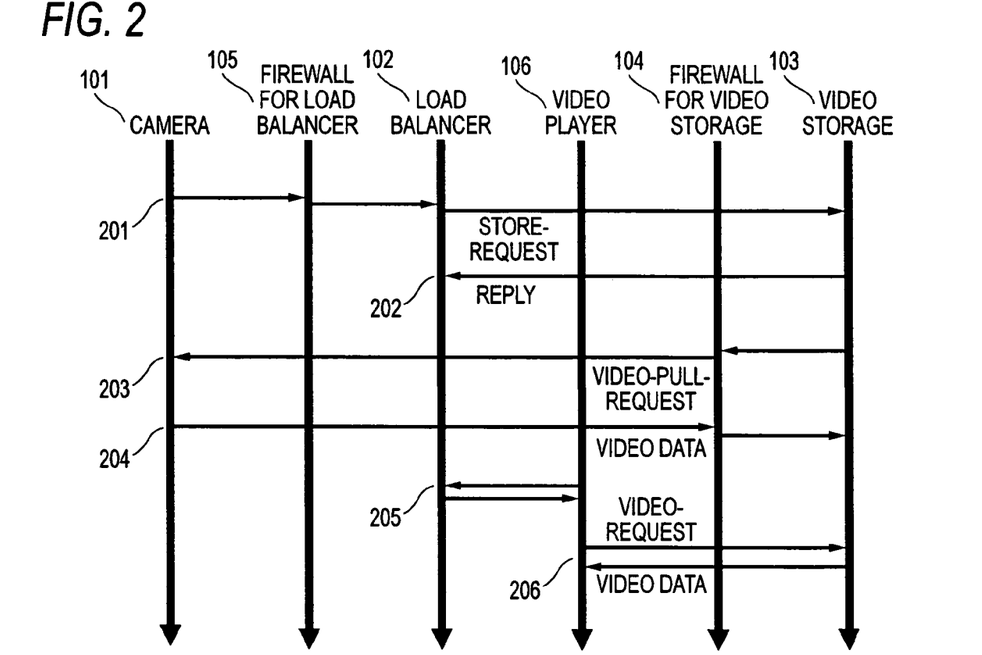
FIG. 2 is a diagram of a process of storing a video.

Next, a process of storing a video generated by camera 101 in memory 113 of video storage 103 (Steps 201 to 204) and a process of playing the stored video (Steps 205 and 206) is described with reference to FIG. 2. FIG. 2 shows a flow of a communication among camera 101, the firewall for load balancer 105, load balancer 102, video player 106, the firewall for video storage 104, and video storage 103. In FIG. 2, time in the direction of the arrow is indicated by the vertical axis, and data transmission between the devices is indicated by the horizontal axis (the data being transmitted in the direction of the arrow).

When camera 101 informs load balancer 102 that a video is to be stored (Step 201). Load balancer 102 sends a store-request to a selected one of video storages 103. The load balancing procedure (algorithm) will be described later in this specification.

In Step 201, load balancer 102 may inquire of camera 101 whether or not there is a video to be stored. In this case, the user or the like has to register a list of addresses of the cameras at memory 123 of load balancer 102 in advance of the inquiry.

Upon reception of the store-request, processing unit 114 of video storage 103 executes store-request check procedure program 110 based on information such as a total bit-rate of a video being stored, a total bit-rate of a video being read, and an available space in storage element 112 to check whether or not the request is acceptable. Processing unit 114 then sends a check result to load balancer 102 in reply (Step 202).

When the request has not been accepted, load balancer 102 sends a store-request to another video storage 103 in accordance with the algorithm (described later). When the request has been accepted, video storage 103 sends a video-pull-request to camera 101 (Step 203). Video storage 103 receives video data from camera 101 in response to the video-pull-request (Step 204). The video data are stored in storage element 112 after store procedure program 111, which varies depending on the protocol and format (codec) of the video, has been executed.

Figure 6:
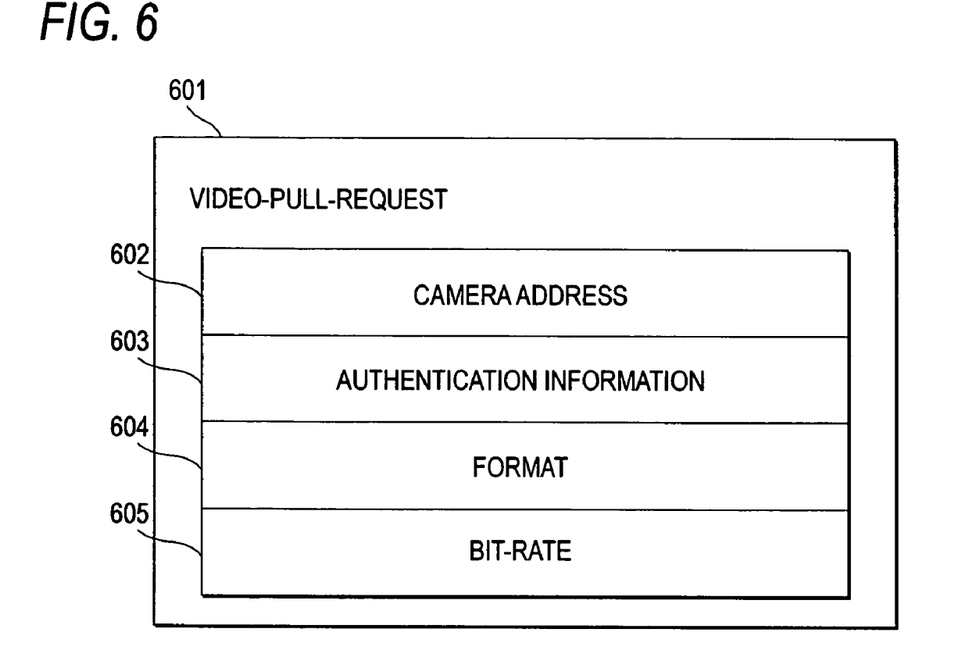
FIG. 6 shows a specific example of a video-pull-request sent when storing a video.

Details of the video-pull-request are shown in FIG. 6. Video-pull-request 601 includes information such as a camera address 602, authentication information 603, a format 604, and a bit-rate 605. When camera 101 conforms with multiple formats and bit-rates, processing unit 114 selects one of the values of the formats and the bit-rates with reference to format 604 and bit-rate 605 of the video. By embedding a password which has been generated at random within the store-request sent from camera 101 and using the password as authentication information 603, it is possible to confirm that the sender of the store-request is the user pulling the data. Since the access is made from video storage 103 to camera 101 in the PULL mode, it is unnecessary to provide each of video storage module with an authentication function with video transfer ability as in the PUSH mode, in which access is made from camera 101 to video storage 103.

The transmission between camera 101 and load balancer 102 in Step 201 is performed via the firewall for load balancer 105, and the transmissions in Steps 203 and 204 are performed via the firewall for video storage 104. Since firewall 104 sends and receives a large quantity of video data, it performs simple filter processing such as blocking against all external accesses in order to avoid impairment of processing ability.

In turn, since firewall 105 sends and receives a smaller quantity of control, it is capable of executing encryption, authentication, complicated filter processing, and the like. More specifically, by separating the transmission path of the control data from that of the video data, it is unnecessary to install an expensive firewall which has a high throughput and is capable of executing complicated authentication and filter processing.

Next, a process of playing the stored video is described. Video player 106 is used for playing the video. After inquiring of load balancer 102 where a desired video is stored (Step 205), a video-request is sent to video storage 103 (Step 206). After the video to be played is specified by the video-request, the video data are sent from video storage 103 to video player 106.

Figure 7:
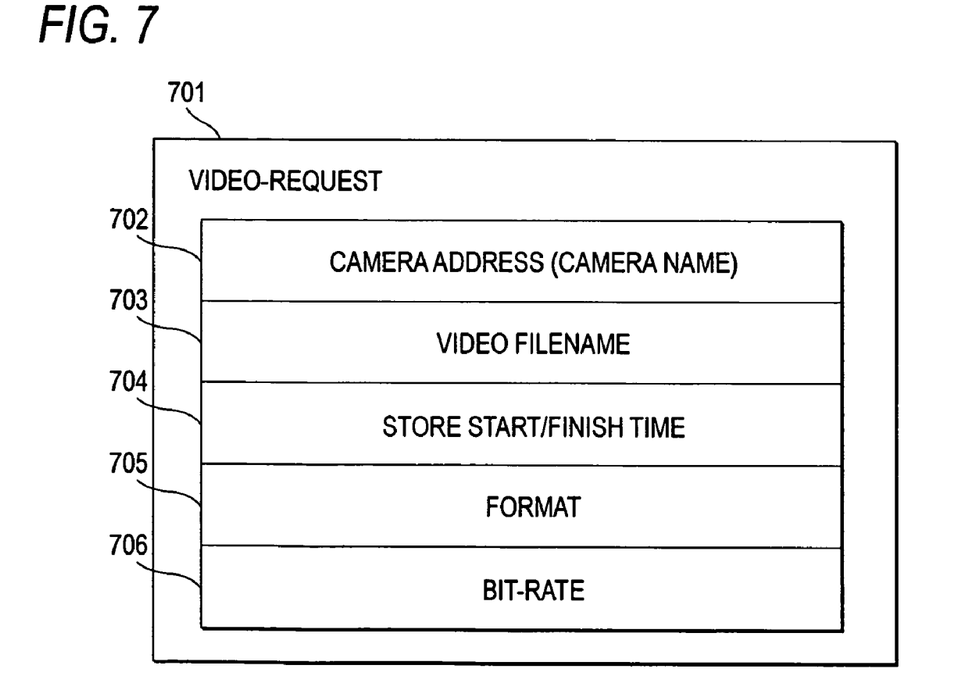
FIG. 7 shows a specific example of a video-request sent when playing a video.

Contents of the video-request are shown in FIG. 7. Video-request 701 includes information such as a camera name 702, a video filename 703, a store start/finish time 704, a format 705, and a bit-rate 706. The form of contents of a reply to the video-request is similar to that of FIG. 7. When one video matches the first video-request, a video-request reply including information and data of the video are sent to video player 106. When a number of videos match the video-request, a list of the videos is sent to video player 106. The list is displayed on monitor 165 of video player 106, and the user specifies one of the videos in the list and plays the video using a subsequent video-request.

When a term used in the first video-request is too broad and there are too many matching videos, the user may interrupt the listing up to prevent an excessive load on load balancer 102. A procedure performed in load balancer 102 for creating the list (video-request reply) is described later in this specification.

Next, a process performed when an obstacle occurs in storage element 112 is described. Processing unit 114 executes obstacle detection procedure program 107 and, when one of disk units of storage element 112 has broken down, for example, detects the obstacle. Since the video data will be lost if another disk unit breaks down in this situation, it is desirable to allocate the currently performed storage processing to another video storage 103 in order to lighten the load on the disks even when using a redundant system including a RAID5 or the like.

Figure 3:
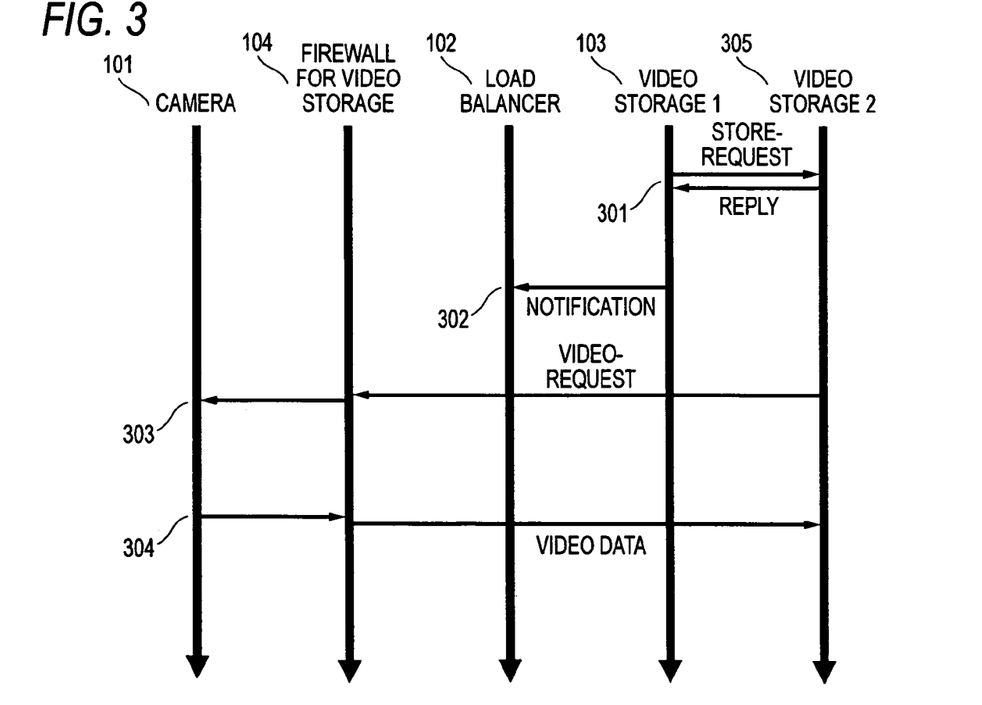

The reallocation process steps are now described with reference to FIG. 3. FIG. 3 shows the flow of communication among camera 101, the firewall for video storage 104, load balancer 102, video storage 1 (103), and the video storage 2 (305). In FIG. 3, the temporal flow(in the direction of the arrow) is indicated by the vertical axis, and data transmission between the devices is indicated by the horizontal axis (the data being transmitted in the direction of the arrow).

First, a store-request is sent from video storage 1 (103) where the obstacle has occurred to another video storage 2 (305). A search for a video storage is performed in accordance with the storage algorithm (described below) until the request is accepted (Step 301). Load balancer 102 (Step 302)is notified of the acceptance of the request. With the notification, a video storage allocation state table, which is described later in this specification, is updated. Video storage 2 receives a video from camera 101 (Steps 303 and 304).

The load balancing algorithm is now described with reference to FIG. 4. When the power is turned on (Step 401), processing unit 114 of video storage 103 initializes the list of video storages and a pointer for the list (Step 402). The list is stored in memory 123 of load balancer 102. The list may be registered by the user or may be automatically updated.

Figure 8:
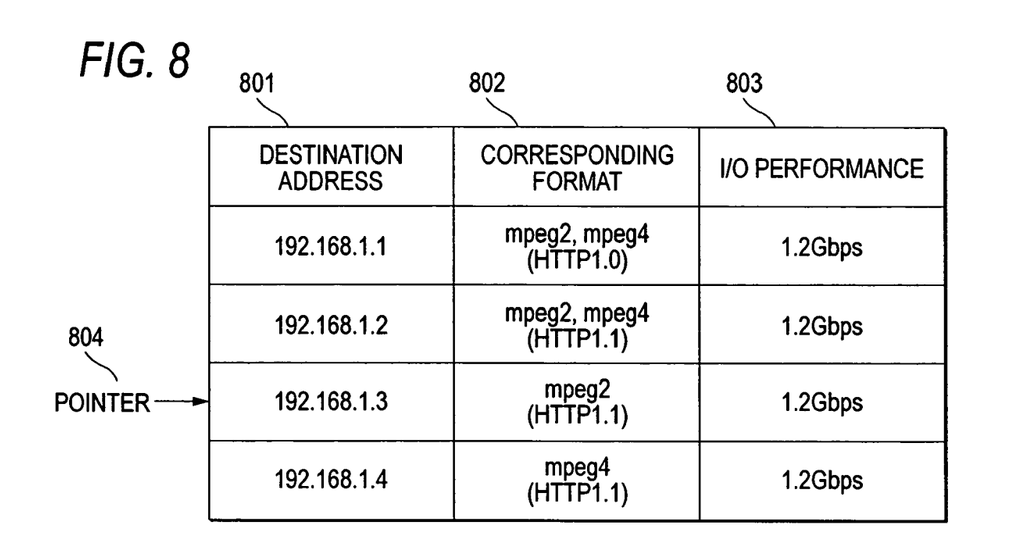
FIG. 8 shows a specific example of a video storage list.

The video storage list is shown in FIG. 8. The list is a table summarizing information such as the addresses and performance of the video storage modules, and each line of the table consists of a destination address (801), a corresponding format (802), and an I/O performance (803). Pointer (804) refers to any one of the lines. A specific example of the destination address 801 may be an IP address. Information such as a video format (mpeg2, mpeg4, and so forth) and type of video transfer protocol (HTTP, RTP, and so forth) is included in corresponding format 802. I/O performance 803 represents the total bit-rate of data the video storage can store at one time. By using corresponding format 802 and I/O performance 803 together with information included in the video storage allocation state table (described later), it is possible to predict whether or not a store-request will be acceptable before the request is sent, thereby speeding up the processing. Details of such processing are described below.

When an obstacle occurs(Step 403), checked is made of whether or not the pointer indicates the video storage in which the obstacle has occurred (Step 404). If the pointer indicates the video storage in which the obstacle has occurred, the pointer is shifted to an adjacent line (Step 408). Then, a store-request relating to a store procedure which is being executed is sent to the video storage indicated by the pointer (Step 405). A reply (acceptance or non-acceptance) to the store-request is sent from the video storage to which the request has been sent. The store-request is sent sequentially to the video storage modules by shifting the pointer from one video storage to another until the request is accepted (Steps 406 and 408). Upon acceptance of the store-request, the video storage list is updated to end the processing (Step 407).

Figure 9:
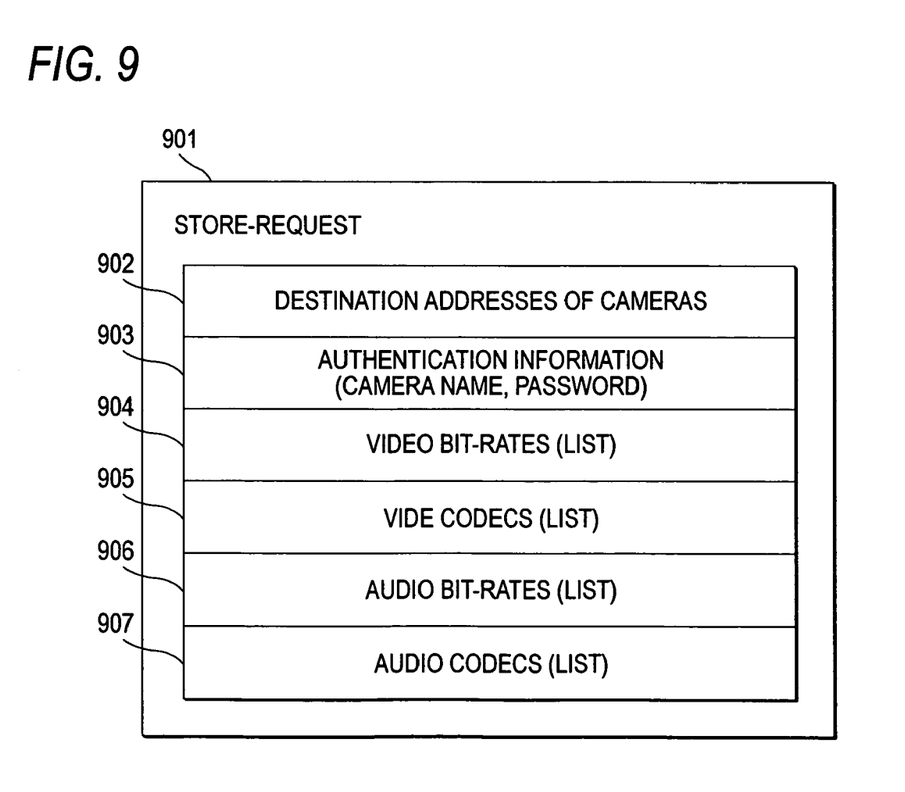
FIG. 9 shows a specific example of a store-request.

Next, the contents of the store-request are described with reference to FIG. 9. Store-request 901 includes destination addresses (902) of cameras, authentication information 903 including camera names and passwords, and information such as bit-rates and codecs of videos and audios to be stored (904 to 907). Each of the video storage modules can pull a video from a camera by using the destination address 902 of the camera. Since the camera can be in conformity with a number of codecs and bit-rates in some cases, each of codec and bit-rate is described in the form of a list.

Figure 10:
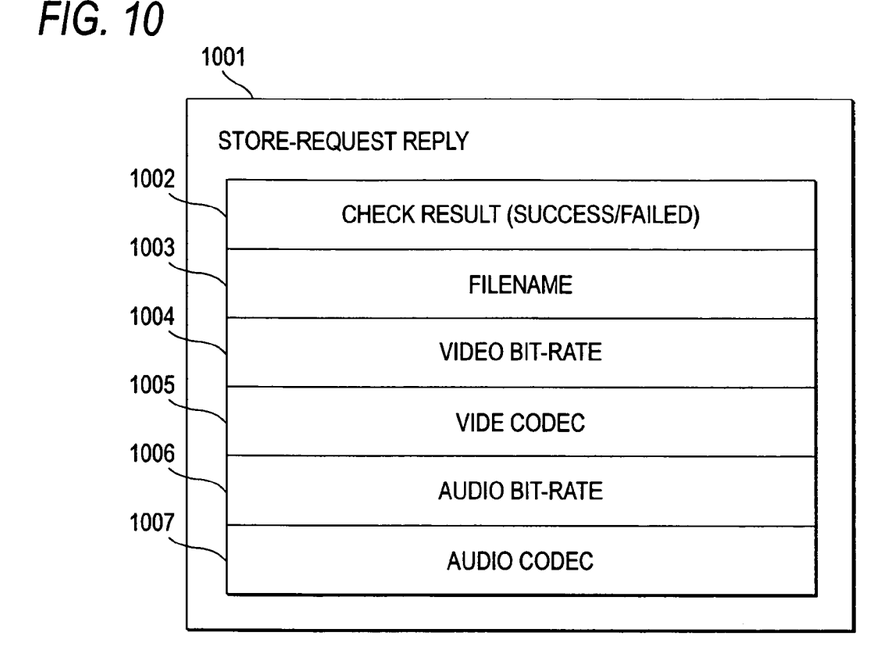
FIG. 10 shows a specific example of a store-request reply.

The contents of a reply to the store-request are shown in FIG. 10. A store-request reply 1001 includes a check result 1002 indicating acceptance or non-acceptance of the request. A filename 1003, a video bit-rate 1004, a video codec 1005, an audio bit-rate 1006, and an audio codec 1007 are generated and included in the store-request reply in the case of acceptance. By giving the cameras names in authentication information 903 of store-request 901 in such a manner that each of the cameras has a name unique to it, it is possible to use the name as a part of the filename required for storing the video. For example, filename 1003 can be generated by using a character string and a time unique to each of the cameras. By generating the filename in the above-described manner in load balancer 102 and sending the filename as a part of the authentication information in the store-request to video storage 103, filenames unique to the overall system may be generated.

Figure 5:
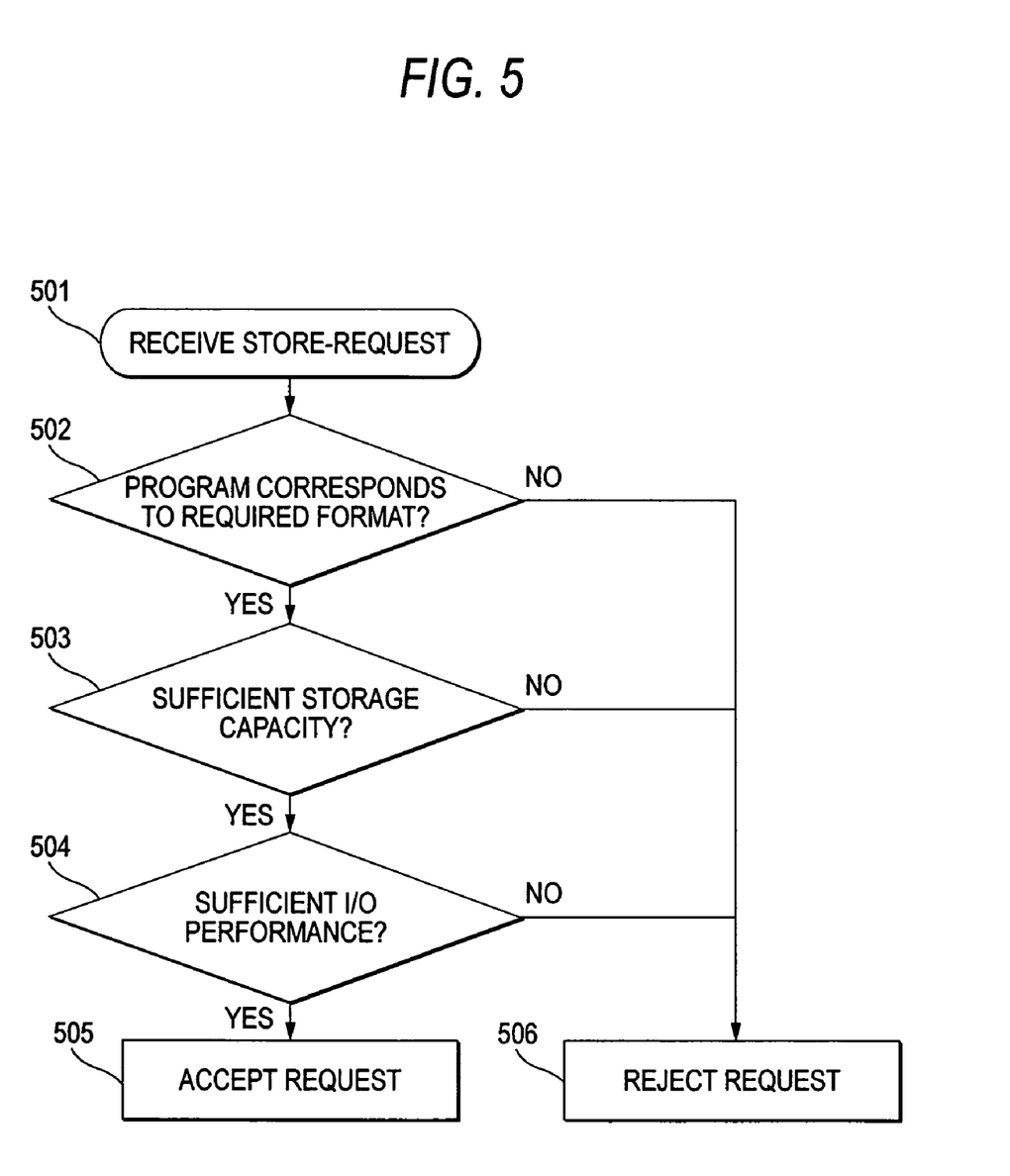
FIG. 5 is an operation algorithm of a store-request check device.

An operation algorithm of store-request check procedure 110 is now described with reference to FIG. 5. Processing unit 114 of video storage 103 receives a store-request (Step 501) and then checks whether or not a video read procedure program 111 corresponding to a required format exists. When there is no corresponding format, the request is rejected (Step 506). Next, an available space in storage element 112 is checked (Step 502). The request is rejected when the available space is insufficient (Step 506). Then, a bit-rate of a video which is being stored and a bit-rate of a video which is being read are calculated to check if the I/O performance is sufficient for the bit-rates. The request is accepted when the I/O performance is sufficient for the bit-rates (Step 505). The request is rejected when the I/O performance is insufficient for the bit-rates (Step 506).

Next, the above-mentioned video storage allocation state table is described with reference to FIG. 11. The table is stored in memory 113 of video storage 103 and includes camera names (1101) unique to each camera, allocated video storage addresses (1102), total bit-rates (1103), formats (1104), store times (1105), filenames (1106), and so forth. The table is added every time a store-request is accepted by the video storage 103. For example, by calculating the total bit-rate allocated to a certain video storage module, it is possible to know whether a request will be accepted or not by comparing the bit-rate with the video storage I/O performances in the video storage list without actually sending a store-request. The request is not accepted if the total bit-rate is out of the range of the I/O performances, whereas the request is accepted if the total bit-rate is within the range of the I/O performances. When the video storage is changed during storage processing, the store finish time is written in the original file to generate a new file and a new video storage allocation state table.

Figure 11:
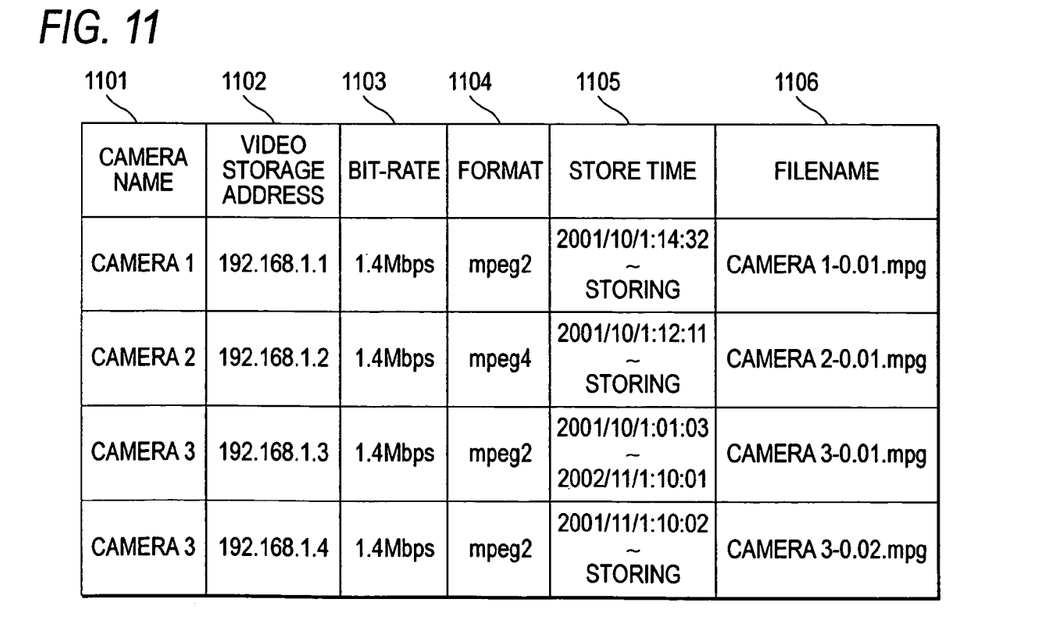
FIG. 11 shows a specific example of a video storage allocation table.

An example of the change of video storage is shown in lines 3 to 4 of FIG. 11. The third line indicates existence of video data from 01:03 of Oct. 1, 2001 to 10:01 of Nov. 1, 2001 stored in the original storage module having the address 192.168.1.3, and the fourth line indicates that the video storage having the address 192.168.1.4 has been performing video storage since 10:02 of Nov. 1, 2001. The entry of the third line indicating non-storage is used only when playing a video. The entries of current storage modules can be used for predicting a store-request check result.

As described in the foregoing, the video-request to play a video is sent from video player 106. A list consisting of information, selected from the video storage allocation state table in load balancer 102 and matching the contents of the video-request, is sent back to video player 106 as a video-request reply.

Figure 4:
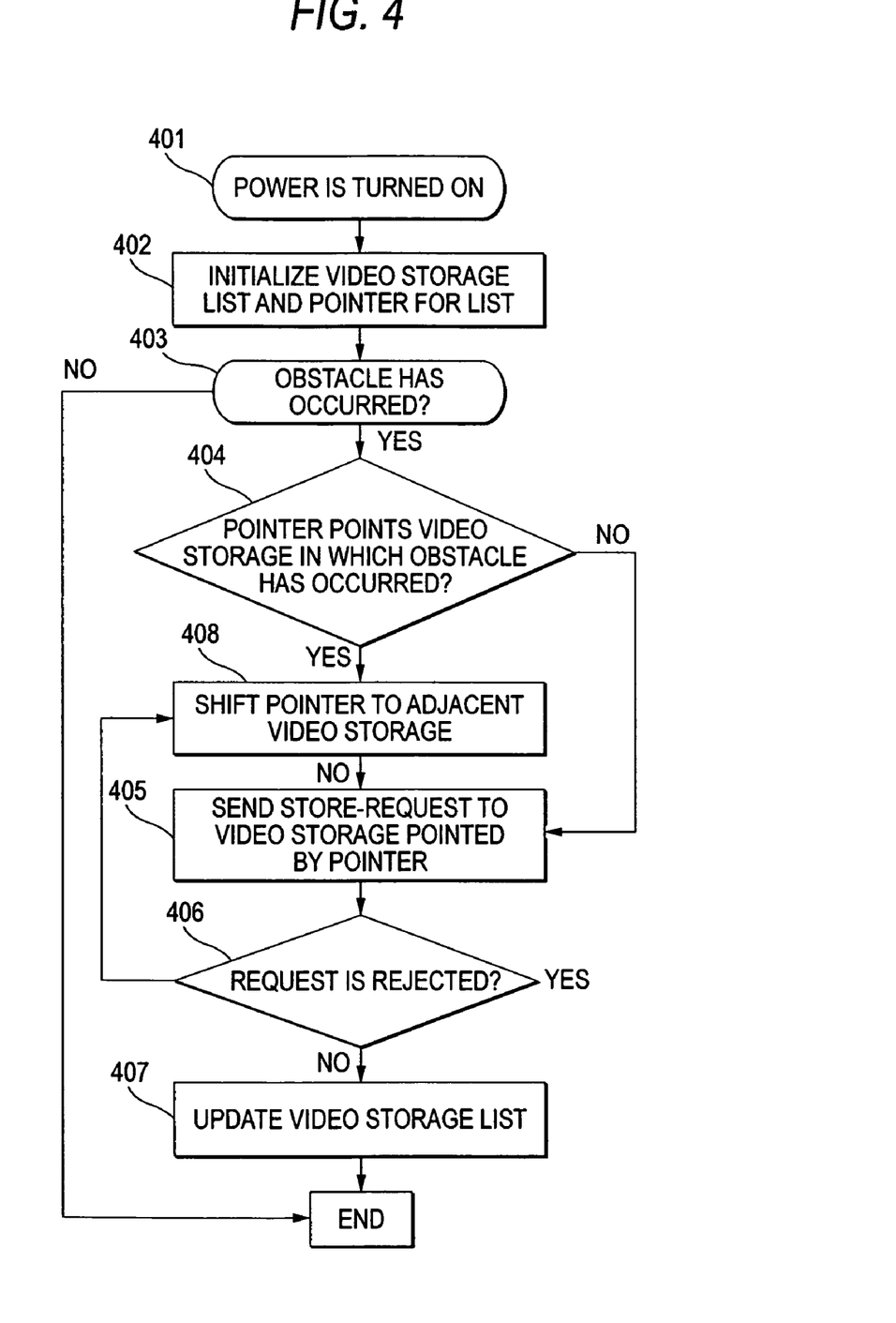
FIG. 4 shows a load balancing procedure, according to the present invention.

By retaining the above-described video storage list and the video storage allocation state table in load balancer 102, it is possible to predict a result of a store-request (405) using the algorithm shown in FIG. 4. This reduces transmissions of unnecessary store-requests, thus improving the system performance.

Second Embodiment

In this embodiment, a system different from that described as the prerequisite in the foregoing description is described. In the first embodiment, the PULL mode is used as the method of sending/receiving video data and a store-request from a camera is pushed to a load balancer. However, it is possible to use not only the PULL mode but also the PUSH mode as the method for sending/receiving video data. Moreover, since it is possible to select the PUSH mode or the PULL mode for sending a store-request from a camera in addition to the above-mentioned video data sending/receiving methods, four embodiments can be made by combining the methods. An example of using the PUSH mode for sending/receiving video data and the PULL mode for sending/receiving store-request is now described to prove feasibility of the four embodiments.

Figure 12:
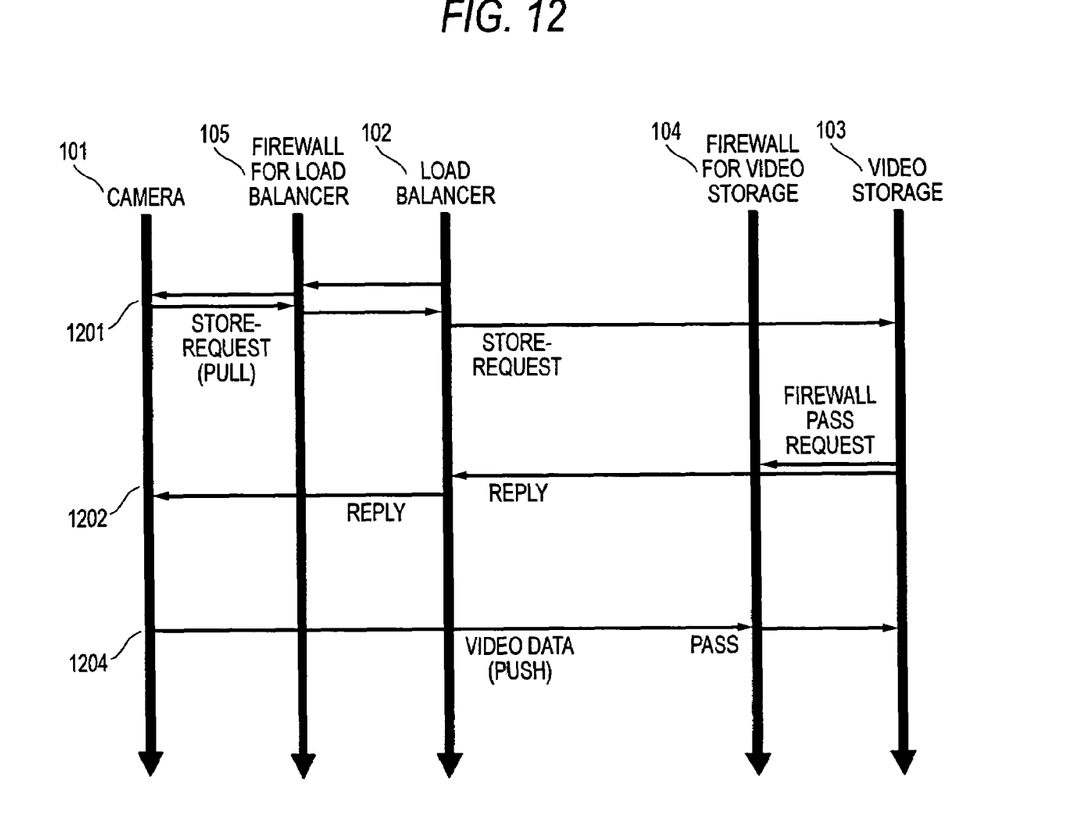
FIG. 12 shows a process for storing a video according to a second embodiment.

An overall operation procedure is described with reference to FIG. 12. First, a video data sending/receiving method using the PUSH mode is explained, and then the store-request sending/receiving method using the PULL mode wherein a load balancer pulls the store request from a camera is described. FIG. 12 is a flow chart showing communication among a camera 101, a firewall for load balancer 105, a load balancer 102, a firewall for video storage 104, and a video storage module 103, during a process (Steps 1201 to 1204) of storing a video generated by camera 101 in a storage element 112 of video storage 103. In FIG. 12, flow of time (in the direction of the arrow) is indicated by the vertical axis, and data transmission between the devices is indicated by the horizontal axis (the data being transmitted in the direction of the arrow).

First, in Step 1201, load balancer 102 asks camera 101 via firewall for load balancer 105 whether or not there is a video to be stored. In reply, a store-request is sent to load balancer 102 (PULL), which selects one of a number of video storage modules 103 to transfer the store-request.

Then video storage 103 sends a reply to the request (Step 1202). When accepting the request, video storage 103 sends a request to permit the video data to pass through firewall for video storage 104 (Step 1203). Upon receipt of the reply sent in Step 1202, camera 101 confirms the acceptance of the store-request to send the video data to video storage 103 (Step 1204). Since the video data have been permitted to pass through the firewall in Step 1203, the video data are stored in video storage 103. The foregoing is the overall operation procedure Next, details of sending/receiving of video data using the PUSH mode are described. In the PUSH mode where a video is sent from a camera to video storage, it is impossible to pass through the firewall. Therefore, two functions are added. First, a new step is added to the read procedure of video storage. The video storage is brought into a video receive standby state while concurrently receiving a store-request. Then, at the time the store-request is sent to video storage, load balancer 102 issues an instruction for creating a hole for passing the video data therethrough to the firewall for video storage 104. Thus, it is possible to use both cameras in the PUSH and PULL modes. For example, it is possible to shift a monitoring system having cameras in the PUSH mode gradually into the method of this embodiment. Although it is possible to keep the size of the hole in the firewall as small as possible by creating the hole using an instruction from video storage, that structure is disadvantageous from a security standpoint compared with the PULL mode, which blocks all accesses from external networks.

A description of the method of sending/receiving a store request using the PULL mode follows. When the load balancer pulls the store-request from the camera, all video storage addresses must be registered at the load balancer prior to pulling. Since there are more cameras in the system than any other devices, the probability of cameras having problems such as breakdowns is relatively high, and this may increase the management cost of address updating when a camera is temporarily removed due a problem. In turn, since it is possible to block all accesses to the load balancer from the camera network in the monitoring area, it is possible to construct a system which is more advantageous from a security standpoint.

Although both the firewall for load balancer and the firewall for video storage are described as an independent devices in the foregoing embodiments, the function of the firewall can be realized by incorporating the firewall into either the load balancer or the video storage. Furthermore, although the load balancer and the video storage are described as an independent devices in the foregoing embodiments, their functions also can be realized by one device. More specifically, multiple disk volumes are connected to one device to realize the functions. The disk volumes and a program for writing data to the disk volumes serve as video storage, and a program for selecting a destination volume from the disk volumes serves as the load balancer. In this case, transmission of control data from the program for selecting a disk volume in which data will be written is equivalent to the transmission of control data from the load balancer to the video storage described in the foregoing embodiments.

Although the control data are separated from the video data to be sent to the video storage via the load balancer in the foregoing embodiments, the device through which the control data are sent is not limited to those having the load balancing function. For example, when using only one video storage module, it is possible to use a simple relay device, like a router, in place of the load balancer. The transmission of control data from the relay device over a control data sending/receiving path to video storage is equivalent to the transmission of control data from the load balancer to video storage described in the foregoing embodiments. There are merits in separating the control data from the video data in this embodiment, too, such as the capability of sending/receiving the control data using a path having the smallest possible latency and sending/receiving the video data using a path having the largest possible throughput.

According to this invention, it is possible to vary the method for protecting the video storage depending on the type of data by separating the control data and video data transfer paths. Accordingly, it is possible to intensively check control data that is smaller in quantity, thereby combining realization of high-security, lower cost video storage protection.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

I claim:

1. A computing system comprising:
   a plurality of data storage devices for storing data which is inputted by a data input device;
   a load balancing device for selecting one of the plurality of data storage devices to store data base on performance information;
   a first firewall device connected to the data input device and the load balancing device, relaying a first quantity of control information; and
   a second firewall device connected to the load balancing device, the data input device, and the plurality of data storage devices, relaying a second quantity of video data,
   wherein the load balancing device receives control information of storing video data from the data input device via the first firewall device, and selects a first data storage device from the plurality of data storage devices to store the video data base on the performance information,
   wherein the first data storage device sends a video pull request to the data input device via the second firewall device, and receives the video data from the data input device via the second firewall device,
   wherein the video pull request includes address information of the data input device, authentication information, format information, and bit-rate information.

2. A computing system according to claim 1, wherein the load balancing device selects the first data storage device from the plurality of data storage devices to store the video data based on the performance information including information of correspondence to required format, sufficient storage capacity, sufficient I/O performance for bit-rate.

3. A computing system according to claim 1, wherein the first firewall device performs packet encryption for the control information.

4. A computing system according to claim 1, wherein when the load balancing device selects the first data storage device, the load balancing device sends the request information of storing data to the plurality of data storage devices and receives response from the first data storage device that the request is acceptable.

5. A computing system according to claim 1, further comprising a video player device,
   wherein the video player device inquires of the load balancing device for a target data storage device storing the video data, requests the first data storage device to send the vide data according to the inquiry, and receives the video data from the first data storage device via the second firewall device,
   which has received the control data depending on a reply to the control data.

6. A computing system according to claim 1, wherein the second firewall device prohibits an access from the data input device.

* * * * *